United States Patent [19]

Van Marr

[11] Patent Number: 4,757,756
[45] Date of Patent: Jul. 19, 1988

[54] TRANSPORTABLE OUTDOOR BARBECUE GRILL

[76] Inventor: James W. Van Marr, P.O. Box 422, Sandy, Utah 84091

[21] Appl. No.: 868,782

[22] Filed: May 29, 1986

[51] Int. Cl.[4] ................................................ A23B 4/04
[52] U.S. Cl. ........................................ 99/482; 99/476; 126/21 A
[58] Field of Search ................ 99/476, 467, 473, 474, 99/480, 481, 482, 419; 126/21 A, 9 R; 426/523

[56] References Cited

U.S. PATENT DOCUMENTS

| | | | |
|---|---|---|---|
| 4,348,948 | 9/1982 | Allison | 99/482 |
| 4,495,860 | 1/1985 | Hitch | 99/482 |
| 4,510,854 | 4/1985 | Robertson | 99/476 |

Primary Examiner—Robert W. Jenkins
Attorney, Agent, or Firm—Trask, Britt & Rossa

[57] ABSTRACT

A portable outdoor barbecue grill having a firebox which communicates simultaneously with a direct cooking chamber and a smoke processing chamber is disclosed. The two chambers are defined by the interior of a drum-like structure. The smoke processing chamber includes a humidifier which may consist of a fluid container with associated piping. The piping channels fluid from the container to the firebox for purposes of heating that fluid. The heated fluid is then returned to the smoke processing chamber and injected into that chamber.

11 Claims, 7 Drawing Sheets

TRANSPORTABLE OUTDOOR BARBECUE GRILL

BACKGROUND OF THE INVENTION

1. Field:

This invention is directed to an outdoor barbecue and smoking grill. More particularly, this invention is related to an outdoor barbecue grill which is transportable.

2. State of the Art:

The preparation of foods by cooking or smoking over an open flame has been known since time immemorial. Since the discovery of fire, mankind ancestors have utilized this source of heat for purposes of cooking or preparing meats and various kinds of vegetables.

The science of cooking and food preparation has progressed considerably from those first days of open fire cooking. Notwithstanding this progress, the flavors produced in various types of food products from being cooked over an open flame still enjoy considerable public demand.

In addition, barbecued foods have experienced a recent upsurge in public demand as a menu item for large outdoor activities such as parties, reunions and similar social activities. Obviously, the provision of open cooking fires for large gatherings creates a considerable number of difficulties.

Various attempts have been made in recent years to develop a cooking apparatus which permits the user to obtain these distinct flavors while at the same time avoiding the inconveniences of having to construct an open fire pit. One approach to providing a cooking or barbecue grill which is both transportable and sufficiently designed to provide a cooking surface for preparing a large quantity of food for a banquet or similar activity is that of U.S. Pat. No. Des. 255,863 (Futch). The device illustrated in Futch includes a cylindrical drum which has been divided into two substantially symmetric parts by a plane which extends substantially parallel to the longitudinal axis of the drum. Each of the respective drum halves is semi-circular in cross section when viewed from the end. The two halves are connected by hinges which permit the hollow interior of the drum to be either accessed or sealed depending on the positioning of the respective drum halves. The longitudinal axis of the drum appears to be oriented substantially horizontally when the grill is in use. The lower positioned drum half is fitted with a substantially planar, grid-like grill which is dimensioned to support the varieties of food to be cooked. Beneath the grill is positioned a firebox wherein combustibles such as hickory wood, coals, and other types of wood may be positioned and ignited. The combustibles generate heat which rises upward through the grill and cooks the various food articles placed on the grill. The lower reaches of the firebox, especially on the end panels of the cylindrical drum half, are fitted with access doors which permit the user to insert combustibles. The cylinder is fitted on a carriage which includes an axle fitted with wheels. Fitted in the outward surface of the second cylindrical half or cover shell is a vent which appears to permit exhaust fumes and smoke generated by the firebox to be discharged outwardly from the interior of the enclosed cylinder.

A second type of outdoor barbecue unit is that which is sold under the trade designation "Super Smoker" by the Deep South Sales Company of Valdosta, Georgia. In the "Super Smoker" configuration, a substantially cylindrical cooking unit includes a drum which is oriented such that its longitudinal axis is substantially horizontal. The drum is fitted with a grill-like lattice work which is positioned substantially horizontal in the interior of the shell. One end plate of the cylinder, which is oriented substantially upright, is cut away on its lower regions. The cut-away region communicates with an exterior mounted firebox. This firebox is dimensioned so as to receive a supply of combustibles. Upon the combustibles being ignited, the heat generated within the firebox is transferred laterally, into the cylindrical housing. The heat cooks the food placed upon the grill-like lattice work. The "Super Smoker" unit approach appears directed toward an indirect as opposed to a direct means of supplying heat to the food products, i.e. the "Super Smoker" positions the firebox in an indirect relationship with the food products. In the "Super Smoker" configuration, a vent-like smoke stack is also fitted on the exterior regions of the cylindrical shell. This shielded smoke stack includes a damper.

The barbecue units which are presently in use are directed principally towards the provision of an open flame cooking means. There exists a need and a commercial requirement for a cooking unit which both includes means of cooking food on an open flame while simultaneously providing an associated smoking unit. Secondly, there exists a need for a means of tenderizing or moisturizing the food which is to be smoked. In typical smoking operations, the food to be processed is subjected directly to the smoke produced by an open flame. The heat as well as the smoke tend to dry the food being processed. As moisture is removed from the processed food, the food becomes dry and less appetizing. Furthermore, in smoke processing the weight of the processed food is dramatically decreased. There exists a need for a process, whereby the food being smoked may either retain or replenish its moisture while maintaining a substantial portion of its initial cooking weight.

SUMMARY OF THE INVENTION

A portable cooking and smoke processing unit of the instant invention includes a cooking chamber which is divided into two identifiable and distinct subchambers. The first chamber, which is adapted for open flame cooking, includes a firebox portion dimensioned and configured to receive a supply of combustibles and to provide for the ignition and continued burning of those combustibles for purposes of providing heat.

A grill is positioned substantially above the firebox. The grill permits a direct contact of the heat and flames produced by the combustibles with food products which may be either placed upon the grill or alternately suspended above the flames by means of a rotisserie-like apparatus mounted on the walls of the first subchamber.

This first subchamber contains means for controlling the heat produced within the firebox. These means may include a damper for purposes of controlling the amount of heat and exhaust which are permitted to exit the subchamber. The first subchamber is divided from the second subchamber by a substantially upright wall which in its lower reaches contains a grill-like, lattice portion. This lattice portion permits smoke and some heat generated by the firebox to be channeled into the lower reaches of the second subchamber. The upper reaches of the divisional wall are substantially solid, i.e. non-perforated.

In one embodiment of the invention, a manually openable vent is positioned within this upper portion of the divisional wall. When the vent is opened, heat which is resident in the upper reaches of the first subchamber may be channeled into the second subchamber for purposes of cooking food products positioned therein. The second subchamber contains a support means, e.g. a grill, which is positioned within the subchamber and adapted to support foods for smoke processing.

The lower regions of the second subchamber are adapted for containing a preselected quantity of water or other fluid. The fluid is contained within the subchamber by a portion of the divisional wall which is solid and prohibits the flow of the liquid into the first subchamber or firebox. A piping arrangement may be provided for heating the fluid by bringing the fluid into the proximity of the firebox. This piping may include a solid channel or pipe extending from the fluid supply in the second subchamber through the divisional wall and into the first subchamber proximate the firebox. Heat generated within the firebox may then be transferred to the piping retained fluid which is then channeled back into the second subchamber.

In one embodiment, this construction includes a somewhat "U"-shaped piping arrangement, having a first inlet port in the divisional wall which communicates with a quantity of fluid stored within the lower region of the second subchamber. The fluid introduced into the pipe through the first access opening is directed beneath a grill-like structure which supports the combustibles being burned to provide heat in the first subchamber. The pipe circulates beneath the grill and eventually returns again to the divisional wall which it penetrates. The pipe is fitted with a discharge opening adapted to discharge the heated fluid or steam into either the body of fluid residing in the lower subregion of the second subchamber or alternately into the atmosphere within the second subchamber. The steam being released, tends to increase the humidity within the second subchamber. This elevated humidity facilitates a retention of fluids within the foods being processed.

The second subchamber includes a vent which includes a damper adapted to control the quantity of humidity, smoke and other discharge which may be released to the environment. This vent may include a positive action impeller positioned on the vent for purposes of drawing the smoke, fumes, humidity or other by-products from within the second subchamber. This positive action impeller may be, for example, a wind turned vent or impeller.

The outer shell of the barbecue cooker includes access doors permitting the user to access the respective subchambers. A hot warming drawer may be positioned within the lower region of the second subchamber. This drawer is a sealed box which may be inserted into the environment of the second subchamber. Since it is sealed, the drawer is subjected to the minimal heat concentrations of the second subchamber while retaining its contents free from exposure to the moisture and heat smoke within that subchamber.

The first subchamber is fitted with an access door adapted for the user to add or supplement the combustibles within the firebox. At least one, if not more vents, are provided each with its perspective damper for provision of oxygen to the firebox. The user may adjust the various dampers to control the quantity of heat produced within the cooking unit by controlling the amount of air available for combustion purposes.

The subchambers may be mounted on a carriage which may be fitted with one or more axles and associated wheels. This carriage may be fitted with a tongue which permits the attachment of the carriage to a suitable propulsion means such as a truck or other type vehicle.

DETAILED DESCRIPTION OF THE DRAWINGS

Figure 1:
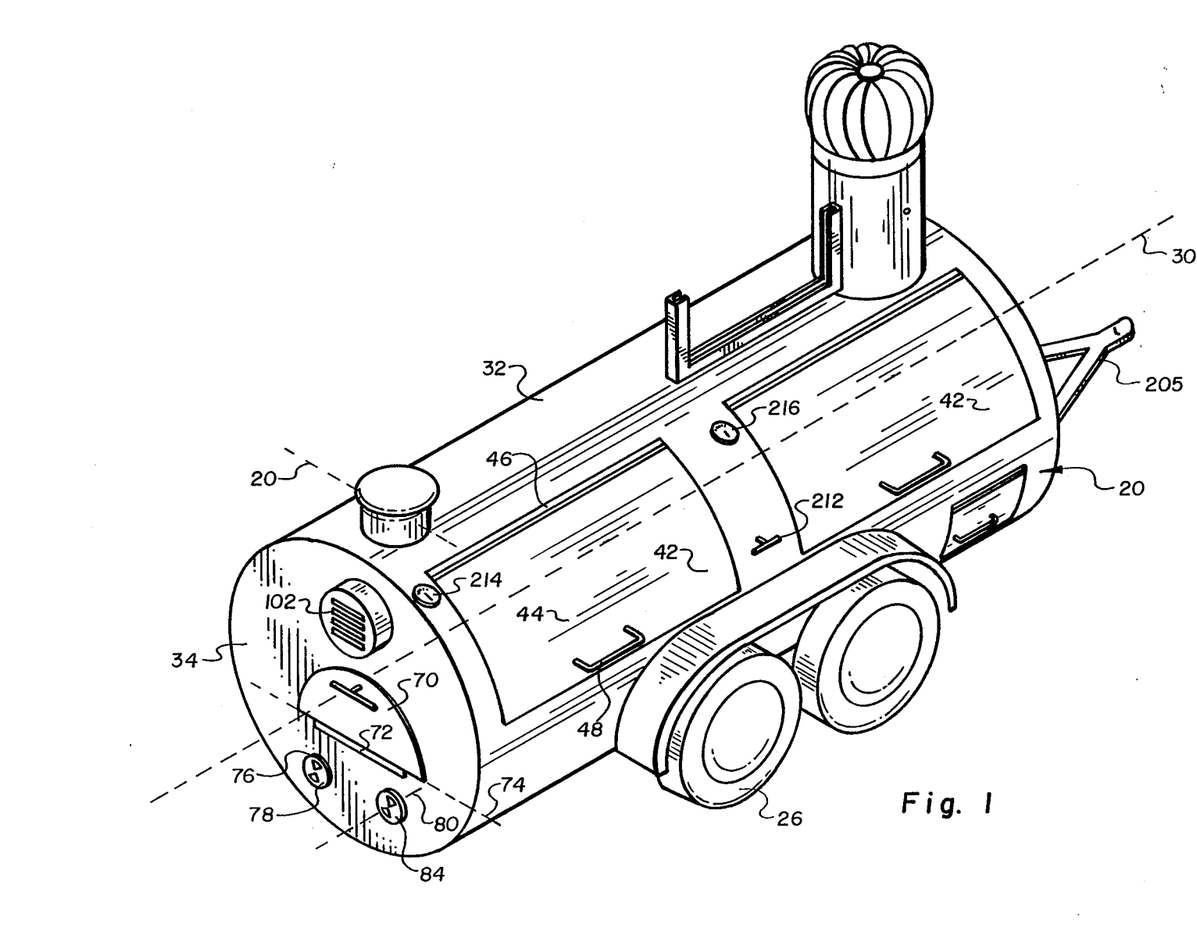
FIG. 1 is an elevated perspective view of a transportable cooking and smoking unit of the instant invention.
Figure 3:
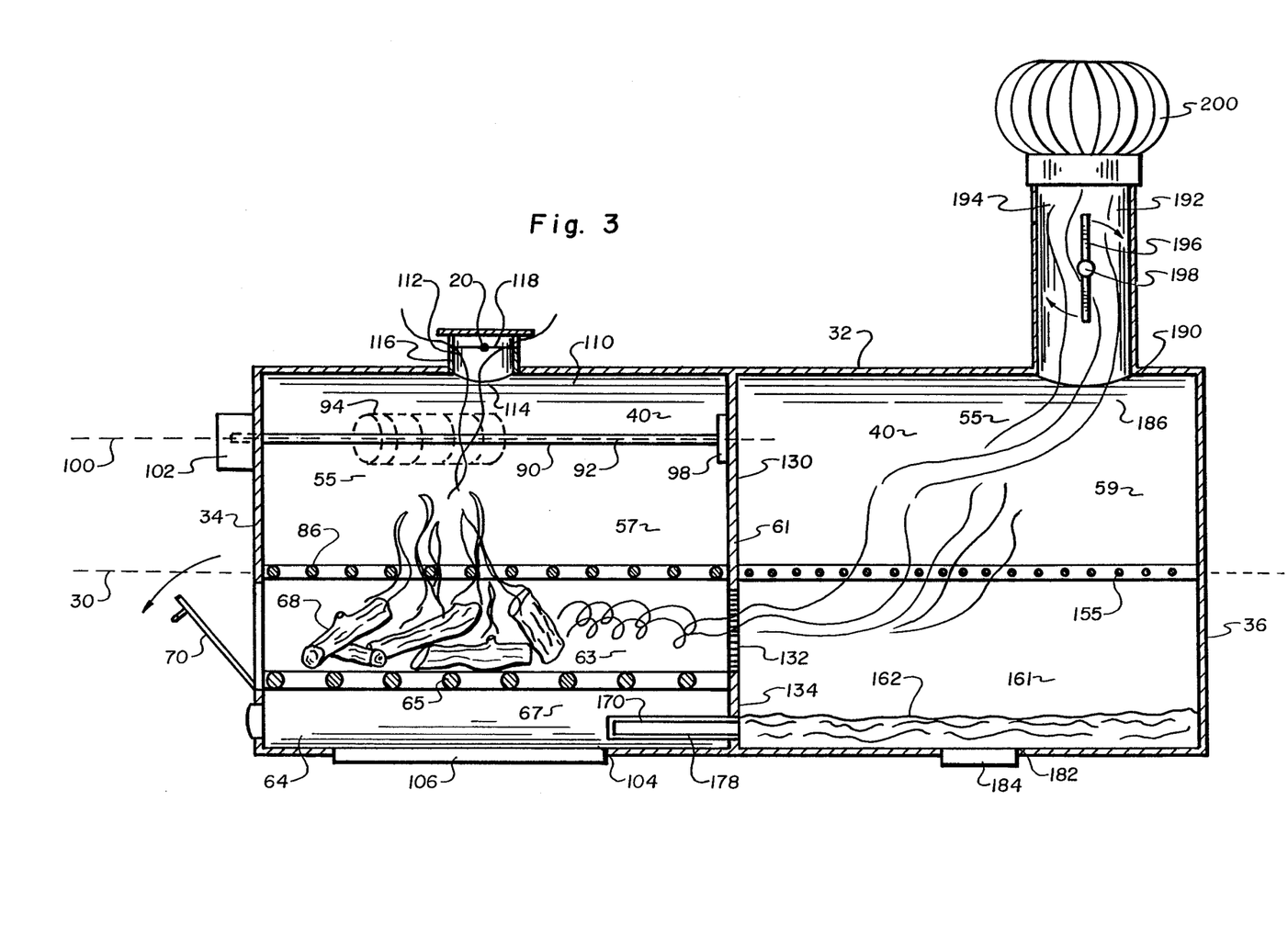
FIG. 3 is a cross-sectional view of the unit shown in FIG. 1 taken along sectional lines 3—3.
Figure 4:
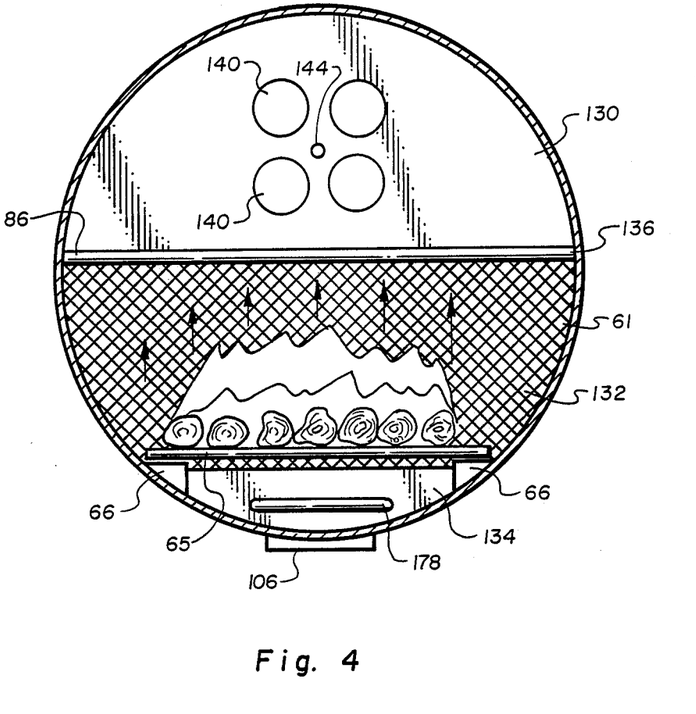
FIG. 4 is a cross-sectional view of the cooking unit shown in FIG. 1 taken along sectional lines 4—4.

A cooking and smoking apparatus of the instant invention includes a food processing unit, generally 20, which is mounted on a carriage generally 22. The carriage 22 includes an axle 24 and a plurality of wheel members 26 rotatably affixed to that axle. As shown in FIGS. 1 and 3, the processing unit 20 is a generally drum-shaped container and may be configured to have a generally cylindrical exterior configuration. The processing unit may be fabricated from metal, e.g. steel, or some other material which is resistant to high temperatures. The unit 20 includes a longitudinal axis 30. The axis 30 is typically positioned in a substantially horizontal orientation when the cooking unit is in use or in transport. The processing unit 20 includes a sidewall 32 which is fixedly mounted to a first end plate 34 and an oppositely positioned circular end plate 36. The combination of the generally hollow tubular sidewall 32 and its attendant end plates 34 and 36 define a generally cylindrical structure with a hollow interior 40.

Figure 2:
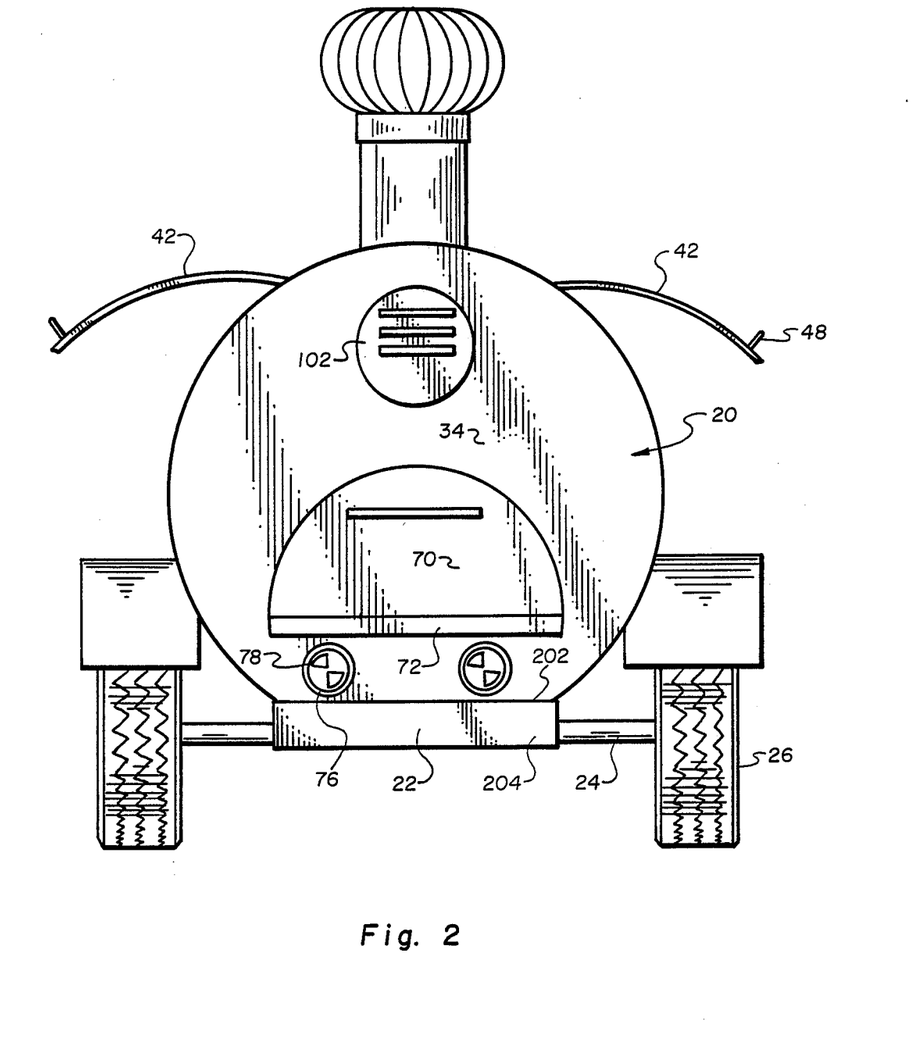
FIG. 2 is an end view of the cooking unit shown in FIG. 1.

Positioned within sidewall 32 is one or more outwardly swinging doors 42. As shown in FIG. 2, these doors include a substantially curved panel 44 which in cross section is generally arc-like. The doors 42 are each hinged to the sidewall 32 by one or more hinges 46. The doors each includes a handle member 48 which extends outwardly from the surface of the door 42 and provides a structure which the user may grasp to swing the door outwardly, as generally indicated in FIG. 2. The two doors, as shown in FIG. 1, may be placed substantially adjacent along the length of the unit 20. In other embodiments such as that illustrated in FIG. 2, the doors 42 may be placed substantially opposite one another within the sidewall 32. The doors 42 are positioned so as to access each of the respective subchambers which are defined within the interior of the hollow cylinder unit 20.

These subchambers, which are identified generally as chambers 55, are adapted to receive and contain the food items or products which are to be processed within the cooking unit. A first subchamber 57 is configured for direct, open flame cooking of meat, vegetables or other food products. The second subchamber 59 is adapted for the smoke processing of meats, vegetables and other food items. The two subchambers 55 are divided by a divisional wall 61 which operates to substantially confine the heat residing within the subchamber 57 to that subchamber. The structure of the wall 61 is adapted to reduce the transference of that heat from subchamber 57 into subchamber 59.

As shown in FIGS. 1 and 3, subchamber 57 may include a firebox generally identified as 63. The firebox 63 includes a grill-like panel or grid 65 which is supported within the lower regions of the subchamber 57 by side supports 66. The grid 65 includes a plurality of apertures therein for permitting air which may be below the grid, i.e. in the region 67, to access combustibles 68 which are positioned atop the grid 65. This air facilitates the burning of those combustibles. The firebox 63 is accessed by means of door 70 which is fitted within the end plate 34 of the cooking unit 20. As shown in FIG. 1, this door may be a substantially planar member which is held and retained against the end plate 34 by a plurality of hinges 72. The hinges 72 permit the door 70 to be rotated about the axis 74 of those hinges thereby exposing an aperture 72 within the end plate 34. The aperture 72 also permits the user to access the interior of subchamber 57. Using the door 70, the user may supply the firebox 63 with materials such as wood, coal, charcoal or other combustible material.

Also, fitted into the end plate 34 is one or more air vents designated generally 76. As shown in FIG. 2, these air vents consist generally of an aperture through the end plate 34 which communicates with the interior of subchamber 57. These apertures may be fitted with a damper 78 or other control means. Damper 78 is adapted to control the quantity of air flow into the subchamber 57. In a preferred embodiment the apertures 76 consist of a series of slot-like openings. Positioned contiguous of these openings is a plate-like planar member 84 which also includes a plurality of slot-like apertures. Cover plate 84 is mounted in a manner well known in the art so as to be rotatable in a plane parallel to the surface of end plate 34, i.e. about an axis of rotation 80. The user may rotate the cover plate 84 to align the apertures within the cover plate with those in the end plate 34. The aligned aperture creates a passageway whereby air may pass from the environment through the end plate 34 into the subchamber 57.

Figure 5:
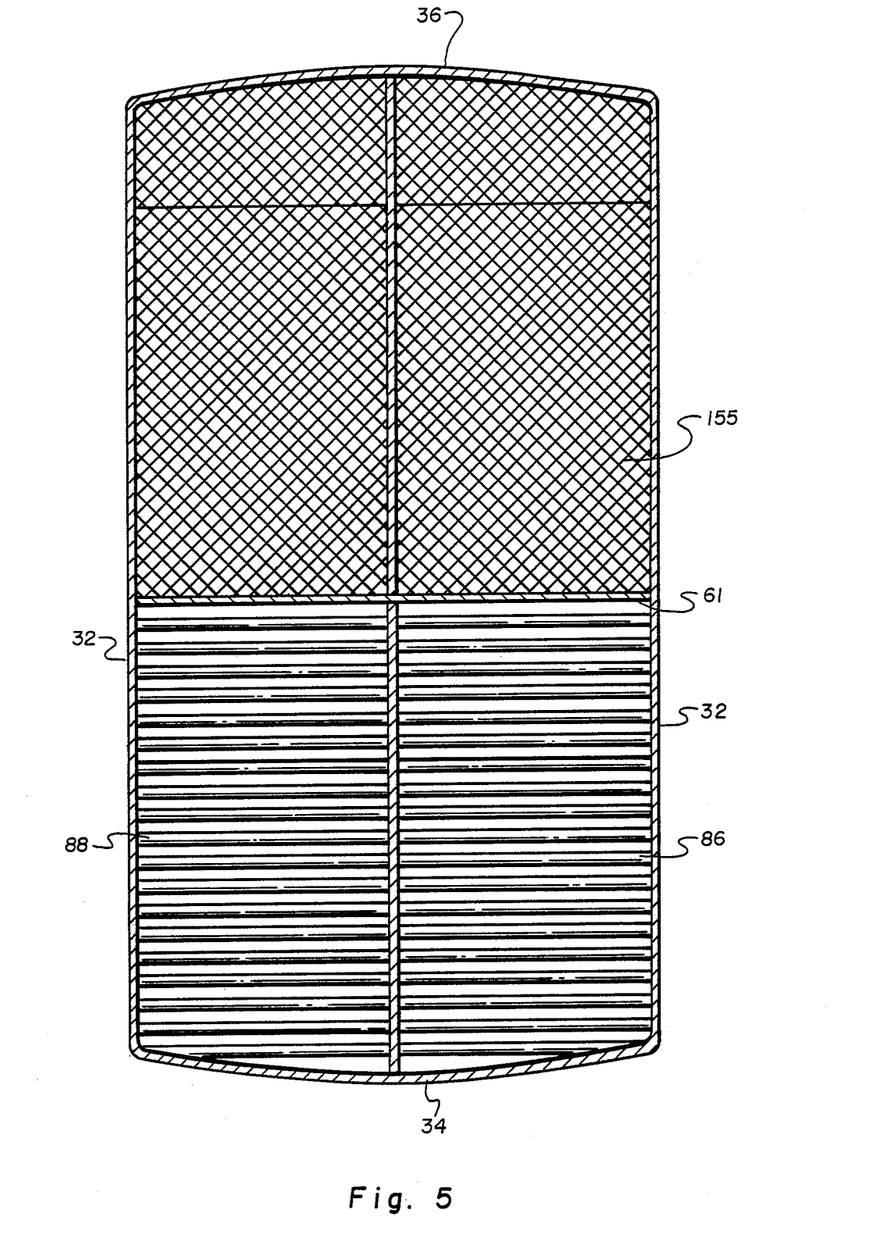
FIG. 5 is a top plan view of the grill which is positioned within the cooking unit shown in FIG. 1.

As may be observed from a comparison of FIGS. 1, 2, and 3, subchamber 57 is substantially a cylindrical shaped chamber. The subchamber 57 may be fitted with a grill or grid 86 which is oriented substantially horizontally, i.e. parallel with the longitudinal axis 30 of the cooking unit 20. The grill 86 may include a generally grid-like configuration, as shown in FIG. 5. The apertures 88 within that grid are dimensioned to permit the upward flow of heat from the firebox positioned below the grill 86. At the same time, the grill 86 prohibits the meats, vegetables or other food products which may be positioned on that grill 86 from falling into the flames or open fire within the firebox 63.

The subchamber 57 may also be fitted with a rotisserie-like attachment generally 90. This attachment 90 may include a shaft-like rod 92 which is oriented parallel to the longitudinal axis 30 of the cooking unit 20. Rod 92 is adapted for receiving meats or other food products generally 94 and suspending those food products 94 above the open flames found within the firebox 63. The rod 92 is supported by a mounting 98 which is fixedly mounted to the divisional wall 61. This mounting 98 is adapted to receive the rod 92 and permit that rod 92 to rotate about its central axis 100. The rod 92 may be mounted to a motorized unit 102 which is adapted to rotate the rod 92 about its axis. This motor unit may be affixed to the exterior surface of cover plate 34.

Fitted within the lower region 64 of subchamber 57 to communicate with the exterior sidewall 32 is a cleaning port 104. Port 104 is generally an aperture within the sidewall 32 which permits the user to access the lower region 64 beneath the firebox 63 for purposes of removing waste, ashes and the like. The cleaning port 104 is sealed by a cover 106. Cover 106 is made to be manually detachable or removable from the discharge port 104 either by the use of hinges or other means well known in the art.

Positioned in the upper regions 110 of chamber 57 is an exhaust port generally 112. This port 112 is adapted to receive heated air, smoke and other exhausts produced within the chamber 57 and discharge those exhausts into the environment. As shown, discharge port 112 may include an aperture 114 within the sidewall 32 of the cooking unit 20. This aperture may be fitted with a chimney 116. This chimney may be a tubular cylinder mounted atop the sidewall 32. The chimney 116 may be fitted with a damper 118 which is made rotatable about an axis 120. The damper 118 may be a planar panel which in plain view is dimensioned to approximate the interior cross-sectional dimensions of the interior of the chimney 118. Given this shape, the damper may be positioned so as to essentially cut-off or close the interior port 112 of the chimney 118. Alternately, the damper may be opened to permit a clear passageway through the channel 122.

Figure 6:
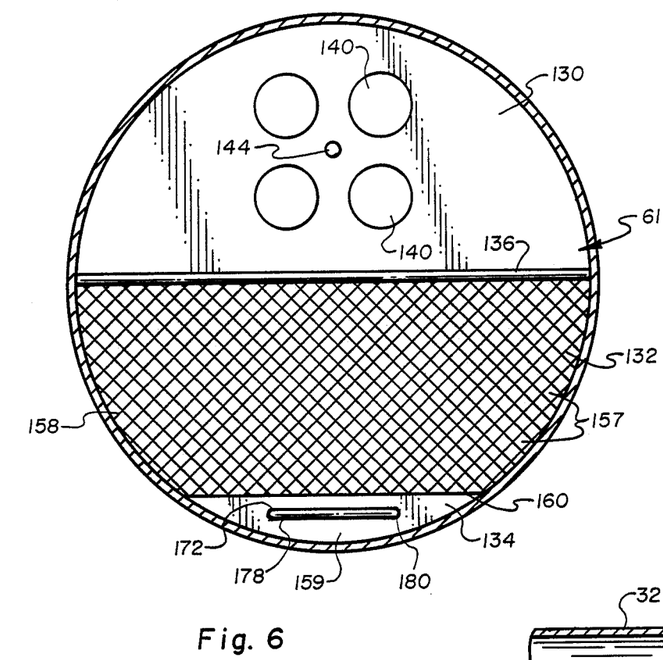
FIG. 6 is a plan view of the divisional wall which separates subchamber 1 from subchamber 2.
Figure 7:
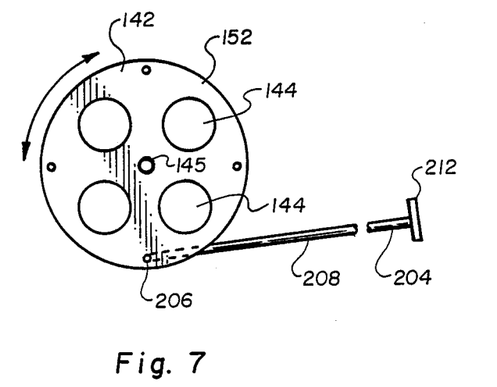
FIG. 7 is a plan view of the adjustable vent which is fitted into the divisional wall illustrated in FIG. 6.

Subchamber 59, as shown in FIG. 3, is positioned proximate the subchamber 57. In a preferred embodiment, the subchamber 59 is separated from subchamber 57 only by the existence of a divisional wall 61. As shown in FIG. 6, divisional wall 61 is divided into three distinct and identifiable sections; a first ection 130, a second section 132, and a third section 134. The first section 130 is divided from the second section 132 by a line of demarcation 136. Generally line 136 is linear. Line of demarcation 136, in a preferred embodiment, is oriented substantially perpendicular to the longitudinal axis 30 of the cooking unit 20.

The upper region 130 of the divisional wall 61 may be substantially planar in configuration and solid. It is perforated only at selected locations by openings 140. As shown is FIG. 6, these openings may be substantially circular in configuration and may be oriented in a substantially quadrant-like positioning. These apertures 140 may be opened or closed by the rotation of a cover plate 142.

Cover plate 142 is a flat planar panel having a circular cross section. Plate 142 includes a plurality of openings or apertures 144. This plate 142 is positioned pivotedly on divisional wall 61 in proximity of the location in the apertures 140 within that section 130.

Figure 8:
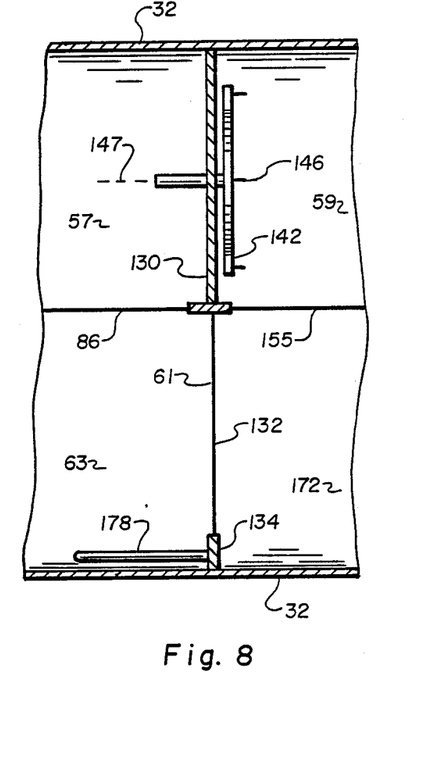
FIG. 8 is a side view of the divisional wall shown in FIG. 6 in association with the adjustable vent shown in FIG. 7.

The plate includes a centrally positioned pivot hole 145 which is adapted to receive a pivot pin 146 which extends outwardly, generally perpendicular, from the surface of divisional wall section 130. A positioning of the pivot pin 146 within the pivot hole 145 orients the planes of the cover plate 142 and the section 130 of divisional wall 61 to be parallel, as shown in FIG. 8. A selected rotation of the cover plate 142 about its pivot axis 150 alines the openings 144 and 140 to form a passageway between the two subchambers. Alternately, the solid portions 152 of the cover plate 142 are positioned over the apertures 140 thereby closing off any communication between the subchamber 57 and subchamber 59 through those apertures 140.

Section 132 of subdivisional wall 61 is a grid or grill configuration having apertures 157 therein. The apertures 157 are defined by a plurality of strip-like members 158 positioned in a generally lattice-like arrangement, as shown in FIG. 6. The line of demarcation 136 is generally positioned within the cooking unit 20 so as to be elevationally below the plane of the grill 86. The apertures 157 within section 132 permit smoke, and to some extent heat, generated within the firebox 63 to flow into subchamber 59. Since section 132 is positioned substantially lateral of the firebox, the heat, and to some degree, the smoke produced within that firebox 63 is not generally directed into the subchamber 59. Instead, the heat and smoke which eventually enter the subchamber 59 are of less intensity and quantity than that which are directed into the upper region 58 of subchamber 57.

The section 134 of subdivision wall 61 is a solid, plate-like panel. Section 134 usually does not contain apertures, but instead defines a essentially solid, non-perforated planar surface 159. Similar to sections 132 and 130, the section 134 is divided from section 132 by a line of demarcation 160. Line 160 is also generally linear and oriented directionally perpendicular to the longitudinal axis 30 of unit 20.

The lower region 161 of subchamber 59, as defined by the sidewall 32, the end plate 36, and the divisional wall section 134, defines a substantially open-topped reservoir or container 162. In accordance with the method of the instant invention, this container 162 is adapted to receive a supply of fluid, e.g. water. This fluid is utilized to enhance the moisture content or humidity of the air within subchamber 59 while foods, meats or vegetables are being processed by smoking. As heated air is received within subchamber 59 from firebox 63, this air induces evaporation of the fluid within the container 162. This evaporated fluid raises the humidity within subchamber 59. In an optimum condition the humidity within the subchamber is raised to a sufficient level that the humidity retards if not prevents the evaporation or loss of fluids or juices from the foods being processed within the subchamber 59. It is even contemplated that the increased humidity within the subchamber 59 may actually increase the fluid content of the foods being smoked.

Figure 9:
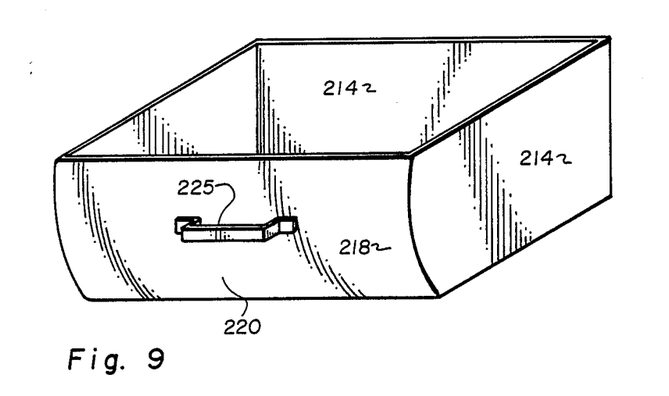
FIG. 9 is a perspective elevational view of a warming drawer.
Figure 10:
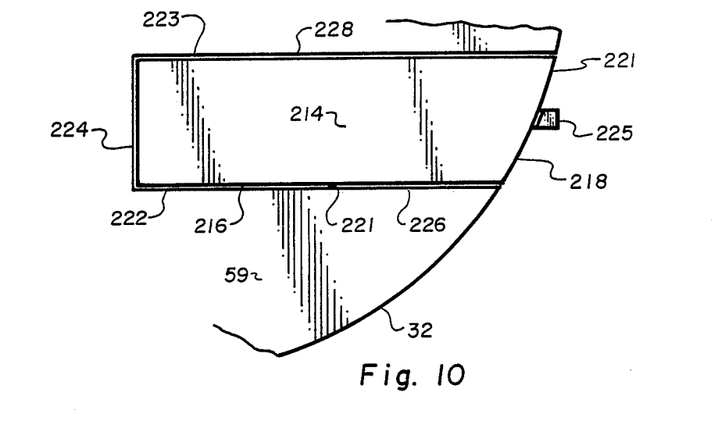
FIG. 10 is a cross-sectional side view of the warming drawer of FIG. 9 in position within the cylindrical cooking unit.
Figure 11:
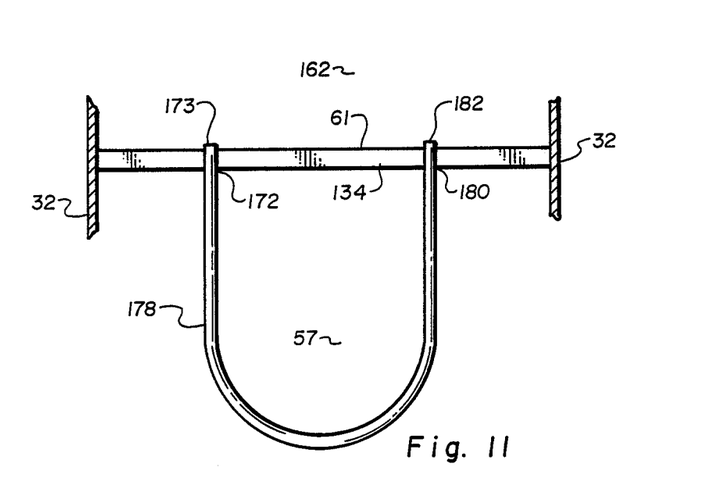
FIG. 11 is a top view of the divisional wall found within the cooking unit.

To encourage a high humidity level, the invention may be fitted with a means of heating the fluid and thereby increasing the rate of evaporation of the fluid from the container 162. As shown in FIG. 9, the divisional wall section 134 may be fitted with a piping arrangement generally 170. Pipe arrangement 170 includes a pipe 178 having a hollow interior channel accessed by oppositely positioned open ends. Pipe 178 is adapted to receive fluid from container 162, route that fluid into the proximity of the firebox 63 to heat the fluid and then return the fluid to subchamber 59. One open end 173 of the pipe 178 is inserted through a first inlet port 172 within the section 134 of sectional subdivisional wall 61. Inlet port 172 communicates with the interior subchamber 59 proximate or contiguous with the container 162 found within the lower regions 161 of that subchamber 59. The pipe member 178 extends from that inlet port 172 into subchamber 57 below the firebox grill 65. Inlet port 172 allows a flow of fluid from container 162 into the interim of pipe 178. The piping 178 is preferably fabricated of metal or some other heat resistant material.

The piping is positioned proximate the firebox 63 and is oriented to readily absorb heat radiated from the firebox 63. The piping 178 transfers that heat to the fluid found within the interior of the pipe 178. From the proximity of the firebox 63, pipe 178 extends back toward the subdivisional wall 61. The opposing open end 177 of pipe 178 is inserted through that wall 61 by means of an outlet port 180. The outlet port 180 may be located in a variety of locations within the divisional wall 61. It may be positioned so as to be below any contemplated level of fluid within the container 162, i.e. it may be within the subdivision wall section 134. Alternately, it may be positioned above any contemplated fluid level to be maintained within the container 162. As a result, the heated fluid and/or steam is directed either into the fluid within container 162, or alternately, directly into the environment of subchamber 59. In either event, the heated moisture and/or steam promotes a high humidity or greater moisture content within the subchamber thereby facilitating the retention of moisture within the foods being processed therein.

This retention of moisture contributes to more juicy food product while avoiding any drying out of the food being processed. The weight loss of processed food products, which has proven to be a serious drawback in prior devices, is thereby avoided.

The sidewall 32 of the subchamber 59 proximate the container 162 is fitted with a discharge port 182. Discharge port 182 may be fitted with a plug-like member 184 adapted to seal the discharge port 182. Member 184 is made manually releasable or detachable whereby the user may remove the plug for purposes of either cleaning the subchamber 59 or accessing that chamber for purposes of repair.

Positioned in the upper region 186 of the subchamber 59 is an exhaust port 190. Port 190 is adapted to channel contaminants, exhaust or other waste products outward into the environment. The discharge port 190 may be fitted with a chimney structure generally 192. This chimney may be an open-ended, cylindrical-like structure defining an interior channel 194. Channel 194 provides a passageway from subchamber 59 to the environments through discharge port 190. The interior channel 194 may be fitted with a damper 196 which includes a substantially planar member which in cross section is substantially dimensionally equivalent to the cross-sectional area of the interior channel 194. This damper 196 is pivotedly mounted by a pivot pin 198 which extends diametrically across the interior channel 194 and is fitted within the walls of the chimney-like member 192. The pivot pin 198 permits the planar member 197 to be rotated between a position wherein the passage 194 is completely closed, to an opposite position wherein the passage 194 is essentially opened permitting exhaust products to be channeled outward into the environment.

Positioned atop the chimney 190 may be an impeller 200 which may be vaned so as to be activated by exhaust products thereby creating a vacuum atop the upper regions of chimney 192. The action of the impeller operates to draw air, smoke, and particulates from within the subchamber 59 and discharge them into the environment. This discharge increases the volume of waste products which are removed from the subchamber 59. The impeller further encourages combustion within the firebox. Under the action of the impeller low oxygen containing combustion products and exhaust an drawn from the firebox through subchamber 59. Fresh oxygen containing air is drawn through air vents 76 into the firebox, to replace the discharged combustion products and exhaust thereby providing oxygen for combustion.

Cooking unit 20 may be mounted on a carriage 22 which includes a central support section 24 configured to receive and fixedly retain the lower sidewall 202 of the cooking unit 20. This support section 204 is fitted with an axle, or alternately a plurality of axles, 24 which are fitted with wheels or tires 26. The support section 204 may also include a tongue 205 adapted for connection with a vehicle, such as a truck, for purposes of transporting the unit 20. The construction of the carriage is of the type well known in the art. Description thereof, therefore, will not be included herein.

The cover plate 142 may be fitted with an adjustment means or control means generally 204. The control means permits the rotation of that cover plate 142 about its axis 147 from a position exterior the subchamber 57 or 59. In a preferred embodiment, control means 204 includes a mounting pin 206 which is fixedly mounted on the surface of the cover plate 142. A connection rod 208, which may be a chain or alternately some other form of linkage well known in the art, is mounted to that pin 206 and extended outwardly toward the sidewall 32 of the cooking unit 20. The linkage 208 passes through the thickness of sidewall 32 and is connected to a handle 212 positioned exterior to the sidewall 32. In this construction, a user may pull, or alternately push, the handle 212 to control the positioning of that cover plate with respect to the openings 140. In a preferred construction, the cooking unit 20 may also be equipped with thermostats or other forms of temperature indicators such as those illustrated generally as 214 and 216. In a preferred embodiment, a thermostat is provided for each subchamber, i.e. subchambers 57 and 59, to provide the user the capacity to monitor the temperatures within either subchamber.

A warming drawer 220 may be fitted into an aperture 221 within the sidewall 32. In one construction, the drawer extends through the sidewall 32 into the lower region of subchamber 59. The drawer 220 includes a plurality of planar upright side panels 214 positioned fixedly on a bottom floor panel 216. One of the side panels 214 may be curved and forms the outwardly facing end 218 of the drawer. A handle 225 is affixed to end 218. The drawer is received and retained in the interior of box-like housing 222 sealedly mounted within the interior of subchamber 59. Housing 222 is formed of three upright sidewalls 224 fixedly mounted to a floor panel 226 and a roof panel 228. The housing 222 defines a box-like configuration having only one end which communicates with the aperture 221. Though the housing extends into subchamber 59, the interior of the housing 223 is sealed from contact with the environment within subchamber 59. When the drawer is in place within the housing, the contents of the drawer are warmed by heat transferred from the subchamber 59 while remaining isolated from the smoke and contained in the subchamber.

It is to be understood that the embodiments herein described are merely illustrative of the principals of the invention. Reference herein to the details of the illustrated embodiment is not intended to limit the scope of the claims, which in themselves recite those features regarded as essential to the invention.

I claim:

1. An apparatus for cooking and smoke processing foods, said apparatus comprising:
    a firebox configured to contain a supply of combustibles which produce smoke and heat upon burning for purposes of cooking and smoke processing foods;
    a first chamber mounted vertically above said firebox and communicating with said firebox, said first chamber configured to receive and retain foods whereby heat and smoke produced within said firebox are directed generally upward into said first chamber for direct cooking of said foods contained therein;
    a second chamber having means to receive and retain foods, mounted substantially lateral of said firebox and communicating therewith, whereby smoke produced within said firebox is directed into said second chamber for smoke processing said foods contained therein and whereby heat produced within said firebox is generally not directed into said second chamber; and
    a humidifying means mounted in association with said second cooking chamber for producing moisture within said second cooking chamber during the smoke processing of foods therein; said humidifying means including an open-ended receptacle positioned within said second cooking chamber for containing a supply of liquid and a conduit means associated with said receptacle for receiving a supply of liquid from said receptacle, directing said liquid sufficiently proximate said firebox that heat from said firebox is absorbed by said liquid, and thereafter directing said heated liquid into said second chamber.

2. The cooking apparatus of claim 1 wherein said conduit means comprises a hollow tube having a first and second open end, said first open end being positioned to communicate with said receptacle whereby liquid contained in said receptacle may be channeled into said hollow tube, said second end being positioned within said second cooking chamber whereby heated liquid exiting through said second open end is discharged into said second cooking chamber.

3. The cooking apparatus of claim 2 wherein said tube is sealed except for said first and second open end.

4. The cooking apparatus of claim 2 wherein said second open end is positioned within said receptacle.

5. The cooking apparatus according to claim 1 wherein said second chamber includes at least one vent.

6. The cooking apparatus according to claim 5 wherein said vent is fitted with a removal means for forcibly removing air from within said second chamber.

7. The cooking apparatus according to claim 1 further having a heating drawer positioned within said second chamber, said heating drawer being adapted to receive foods and retain those foods free from contact with said smoke within said second chamber.

8. An apparatus for cooking and smoke processing foods, said apparatus comprising:
   a firebox configured to contain a supply of combustibles, which produce heat and smoke upon burning, for purposes of cooking and smoke processing foods;
   a smoke chamber, having means to receive and retain foods, mounted in association with said firebox and communicating therewith, whereby smoke produced within said firebox is directed into said smoke chamber for smoke processing said foods contained therein; and
   a humidifying means mounted in association with said smoke chamber for producing moisture within said smoke chamber during the smoke processing of said foods therein; said humidifying means including an open-ended receptacle positioned within said second cooking chamber for containing a supply of liquid and a conduit means associated with said receptacle for receiving a quantity of liquid from said receptacle, directing said liquid sufficiently proximate said firebox that heat from said firebox is absorbed by said liquid, and thereafter directing said heated liquid into said second chamber.

9. The cooking apparatus fo claim 8 wherein said conduit means comprises a hollow tube having a first and second open end, said first open end being positioned to communicate with said receptacle whereby liquid contained in said receptacle may be channeled into said hollow tube, said second end being positioned within said second cooking chamber whereby heated liquid exiting through said second open end is discharged into said second cooking chamber.

10. The cooking apparatus of claim 9 wherein said tube is sealed except for said first and second open end.

11. The cooking apparatus of claim 10 wherein said second open end is positioned within said receptacle.

* * * * *